United States Patent
Hata et al.

(10) Patent No.: US 9,601,795 B2
(45) Date of Patent: Mar. 21, 2017

(54) PROCESS FOR PRODUCTION OF SCANDIA-STABILIZED ZIRCONIA SHEET, SCANDIA-STABILIZED ZIRCONIA SHEET OBTAINED BY THE PROCESS, AND SCANDIA-STABILIZED ZIRCONIA SINTERED POWDER

(75) Inventors: Kazuo Hata, Suita (JP); Norikazu Aikawa, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 401 days.

(21) Appl. No.: 13/503,154

(22) PCT Filed: Oct. 22, 2010

(86) PCT No.: PCT/JP2010/068701
§ 371 (c)(1),
(2), (4) Date: Apr. 20, 2012

(87) PCT Pub. No.: WO2011/049202
PCT Pub. Date: Apr. 28, 2011

(65) Prior Publication Data
US 2012/0231368 A1 Sep. 13, 2012

(30) Foreign Application Priority Data
Oct. 23, 2009 (JP) .................. 2009-244876

(51) Int. Cl.
*H01M 8/10* (2016.01)
*H01M 8/12* (2016.01)
*C04B 35/486* (2006.01)
*C04B 35/626* (2006.01)
*C04B 35/632* (2006.01)
*C04B 35/634* (2006.01)
*C04B 35/636* (2006.01)

(52) U.S. Cl.
CPC ......... *H01M 8/1253* (2013.01); *C04B 35/486* (2013.01); *C04B 35/6261* (2013.01); *C04B 35/6262* (2013.01); *C04B 35/6263* (2013.01); *C04B 35/6264* (2013.01); *C04B 35/62655* (2013.01); *C04B 35/632* (2013.01); *C04B 35/6365* (2013.01); *C04B 35/63416* (2013.01); *C04B 35/63424* (2013.01); *C04B 2235/3217* (2013.01); *C04B 2235/3224* (2013.01); *C04B 2235/3229* (2013.01); *C04B 2235/3232* (2013.01); *C04B 2235/3246* (2013.01); *C04B 2235/3298* (2013.01); *C04B 2235/5409* (2013.01); *C04B 2235/5436* (2013.01); *C04B 2235/5445* (2013.01); *C04B 2235/5481* (2013.01); *C04B 2235/6025* (2013.01); *C04B 2235/72* (2013.01); *C04B 2235/76* (2013.01); *C04B 2235/762* (2013.01); *C04B 2235/77* (2013.01); *C04B 2235/96* (2013.01); *C04B 2235/963* (2013.01); *C04B 2235/9615* (2013.01); *C04B 2235/9638* (2013.01); *H01M 2008/1293* (2013.01); *H01M 2300/0077* (2013.01); *Y02E 60/525* (2013.01); *Y02P 70/56* (2015.11); *Y10T 428/2982* (2015.01)

(58) Field of Classification Search
CPC ....... H01M 2008/1293; H01M 8/1253; H01M 8/1246; H01M 8/12; H01M 8/124; H01M 2300/0077
USPC ....... 429/479, 482, 484, 485, 486, 488, 489, 429/495, 496, 535
See application file for complete search history.

(56) References Cited

U.S. PATENT DOCUMENTS

| | | | |
|---|---|---|---|
| 4,205,051 A * | 5/1980 | Takahashi et al. ........... 423/266 |
| 5,733,499 A | 3/1998 | Takeuchi et al. | |
| 5,955,392 A | 9/1999 | Takeuchi et al. | |
| 6,846,511 B2 * | 1/2005 | Visco et al. .................. 427/115 |
| 7,618,731 B2 | 11/2009 | Kumar et al. | |
| 2002/0187389 A1 * | 12/2002 | Wallin ................ H01M 4/9016 |
| | | | 429/489 |
| 2005/0214616 A1 | 9/2005 | Kumar et al. | |

(Continued)

FOREIGN PATENT DOCUMENTS

| | | |
|---|---|---|
| CN | 101124690 A | 2/2008 |
| CN | 101228099 A | 7/2008 |
| EP | 1858098 A1 | 11/2007 |
| EP | 1916228 A1 | 4/2008 |
| JP | 5-43248 A | 2/1993 |

(Continued)

OTHER PUBLICATIONS

First Notification of Office Action, CN Patent Application No. 201080034368.X, Issue Date Feb. 26, 2013, Issued by SIPO.
Extended European Search Report for EP Application No. 10825051.5, mailing date Jul. 16, 2013, European Patent Office.

(Continued)

*Primary Examiner* — Nicholas P D'Aniello
*Assistant Examiner* — Jimmy K Vo
(74) *Attorney, Agent, or Firm* — Masuvalley & Partners

(57) ABSTRACT

The present invention relates to a method of producing a scandia-stabilized zirconia sheet. The method includes the steps of: (1) pulverizing a scandia-stabilized zirconia sintered body to obtain a sintered scandia-stabilized zirconia powder having an average particle diameter (De), determined by a transmission electron microscope, in the range of 0.3-1.5 μm, and an average particle diameter (Dr), determined by a laser scattering method, in the range of 0.3-3.0 μm, where a ratio of Dr/De is at least 1.0-2.5; (2) preparing a slurry containing the sintered scandia-stabilized zirconia powder and an unsintered zirconia powder, where a percentage of the sintered scandia-stabilized zirconia powder to a sum of the sintered scandia-stabilized zirconia powder and the unsintered zirconia powder in the slurry is at least 2 mass % and at most 40 mass %; (3) molding the slurry into a green sheet; and (4) sintering the green sheet.

4 Claims, No Drawings

(56) References Cited

U.S. PATENT DOCUMENTS

2005/0271919 A1* 12/2005 Hata et al. ............... 429/30
2009/0047562 A1   2/2009 Hata et al.
2010/0159355 A1*  6/2010 Hata et al. ............... 429/495

FOREIGN PATENT DOCUMENTS

| JP | 5-193947 A | 8/1993 | |
|----|---|---|---|
| JP | 6-183833 A | 7/1994 | |
| JP | 8-238613 A | 9/1996 | |
| JP | 10-218662 A | 8/1998 | |
| JP | 2003-26476 A | 1/2003 | |
| JP | 2004-182554 A | 7/2004 | |
| JP | 2009-263157 A | 11/2009 | |
| JP | 2010-027359 A | 2/2010 | |
| WO | WO 2006087959 A1 * | 8/2006 | ............ H01M 8/12 |
| WO | 2007/013567 A1 | 2/2007 | |

OTHER PUBLICATIONS

Notification of Office Action in Chinese Patent Application No. 201080034368.X, issued on Oct. 23, 2013, issued by SIPO (The State Intellectual Property Office of P.R. China).
Third Notification of Office Action in Chinese Patent Application No. 201080034368.X, Issue Date Jul. 10, 2014, Issued by SIPO (The State Intellectual Property Office of P.R. China).
Notification of Office Action in Japanese Patent Application No. 2011-164770, issued on Jan. 14, 2014, issued by JPO.
1st Notification of Office Action issued in CN Patent Application No. 201510102316.6, Issue Date Jul. 15, 2016, total 14 pages with translation.

* cited by examiner

US 9,601,795 B2

PROCESS FOR PRODUCTION OF SCANDIA-STABILIZED ZIRCONIA SHEET, SCANDIA-STABILIZED ZIRCONIA SHEET OBTAINED BY THE PROCESS, AND SCANDIA-STABILIZED ZIRCONIA SINTERED POWDER

This application is a national phase application under 35 U.S.C. §371 of International Application Serial No. PCT/JP2010/068701, filed on Oct. 22, 2010, and claims the priority under 35 U.S.C. §119 to Japan Patent Application No. 2009-244876, filed on Oct. 23, 2009, which are hereby incorporated by reference.

TECHNICAL FIELD

The present invention relates to:
a process for production of a scandia-stabilized zirconia sheet,
a scandia-stabilized zirconia sintered powder used for the said process,
a scandia-stabilized zirconia sheet produced from the said scandia-stabilized zirconia sintered powder,
an electrolyte sheet containing the said scandia-stabilized zirconia sheet,
a solid oxide fuel cell containing the said scandia-stabilized zirconia sheet as an electrolyte sheet, and
a process for production of a scandia-stabilized zirconia sintered powder.

BACKGROUND OF THE INVENTION

In recent years, fuel cells have been drawing attentions as a clean energy source, and studies for improvement and practical application of the fuel cells have been intensively conducted on power generations for home use, for business use and for automobile use. Among the fuel cells, a solid oxide fuel cell is promising as power sources for home and business uses because of the excellent efficiency and superior long-term stability.

As an electrolyte sheet of a solid oxide fuel cell, a zirconia sintered sheet has been used from the view point of the strengths. With the advancements of practical application studies of a solid oxide fuel cell, mass production of a zirconia sheet has become possible. However, the number of the sheet having defects such as warping, swelling and scratches also has been increased. Such defective sheets cannot be used as the electrolyte sheets, since the durability of a solid oxide fuel cell becomes shorten when the sheets are used. Since zirconia and scandia that are used for the stabilization of zirconia crystal structure are expensive, if the defective sheets are just discarded, the manufacturing costs of solid oxide fuel cells are increased.

In the invention described in Patent Document 1, a zirconia powder is prepared from a zirconia sintered body, then the zirconia powder is re-molded, and a zirconia sintered body is obtained by sintering. In more detail, a zirconia sintered body mainly stabilized by 1.5-5 mol % of yttria is heated to increase the ratio of monoclinic phase to be 50% or more and prepare fine sol particles. The fine sol particles are further milled if necessary. The sol particles are dried and granulated, and then molded, and are sintered again. It is described that the re-sintered body obtained by the said invention possesses physical properties equal to those of usual sintered bodies. The Patent Document 1 discloses a desirable average primary particle diameter and average secondary particle diameter (average diameter of aggregated-particles) of the recycled particles. When the average primary particle diameter exceeds 0.3 μm, extremely high temperatures is necessary to sinter the recycled particles. Thus, it is concluded that the powder should be very fine, 0.3 μm or less.

Also in the inventions described in Patent documents 2 to 5, the average primary particle diameters or average secondary particle diameters of zirconia unsintered powders are specified, although a zirconia sintered powder is not used in the inventions. In the said inventions, the reason why the average primary particle diameters are specified is that when the average primary particle diameter is too small, the necessary amount of binder becomes larger and firing shrinkage of the obtained sheet by sintering becomes large. As a result, dimensional stability is decreased. On the other hand, it is described that when the average primary particle diameter is very large, the strength of the sheet is decreased. The reason of specifying the average secondary particle diameters in the said Patent Documents is for suppressing the defects of the surface of the sintered body and improving the sintering properties.

PRIOR ART DOCUMENTS

Patent Documents

Patent document 1: Japan Patent Application Publication H10-218662
Patent document 2: Japan Patent Application Publication H8-238613
Patent document 3: Japan Patent Application Publication 2004-182554
Patent document 4: Japan Patent Application Publication H6-183833
Patent document 5: Japan Patent Application Publication H5-193947

SUMMARY OF THE INVENTION

Problem to be Solved by the Invention

As described above, it has already been known to obtain a zirconia recycled powder from a yttria-stabilized zirconia sintered body and to produce a new yttria-stabilized zirconia sintered body from the zirconia recycled powder. It is described in the above Patent Documents that such a zirconia recycled sintered body possesses physical properties same as those of usual zirconia sintered bodies.

However, according to the inventors' findings, when a large amount of the zirconia recycled powder was used, the strength of the obtained sintered body was inferior to that of the sintered body obtained solely from unsintered zirconia powder, which is a raw material of the recycled zirconia. As a result, a satisfactory sintered body could not be obtained from the recycled zirconia powder alone.

In some of the inventions described in the above Patent Documents, average primary particle diameters and average secondary particle diameters are specified; however, most of the inventions are related to zirconia unsintered powders and are not employed to recycle the already-sintered zirconia powder.

Conventionally, while a yttria-stabilized zirconia powder has been extensively studied, there have been no sufficient studies about a scandia-stabilized zirconia powder, which is more expensive than yttria-stabilized zirconia powder. Thus, the recycle of defective sintered bodies obtained from a scandia-stabilized zirconia powder is desired.

Therefore, the objective of the present invention is to provide a process for efficient production of a recycled sintered sheet, which has a higher strength than that of the scandia-stabilized zirconia sheet produced only from a scandia-stabilized zirconia unsintered powder, using already-sintered scandia-stabilized zirconia powder. The objective of the present invention is also to provide a scandia-stabilized zirconia sintered powder used for the said process. Further, the objective of the present invention is also to provide a scandia-stabilized zirconia sheet for which the said scandia-stabilized zirconia sintered powder is used as a raw material, an electrolyte sheet containing the said scandia-stabilized zirconia sheet, and a solid oxide fuel cell containing the said scandia-stabilized zirconia sheet as an electrolyte sheet. Lastly, the objective of the present invention is also to provide a process for production of a scandia-stabilized zirconia sintered powder.

Means to Solve The Problem

The inventors had dedicated for intensive studies to solve the above-described problems. As a result, unlike the widely used yttria-stabilized zirconia, in the case of scandia-stabilized zirconia which had not been sufficiently studied before, it was found that the sintered body produced from a powder recycled from the sintered body made of a scandia-stabilized zirconia powder had larger strength than the sintered body produced solely from an unsintered powder. It was also found that the defects less frequently occurred by the present invention production process. Then, the inventors completed the invention by the discovery that a sintered sheet having high strength can be produced with excellent productivity by using a scandia-stabilized zirconia sintered powder that has a relatively larger average particle diameter measured using a transmission electron microscope and that has a proper ratio of the average particle diameter measured by a laser scattering method to the average particle diameter measured using the transmission electron microscope.

The process for production of a scandia-stabilized zirconia sheet according to the present invention is characterized in comprising the steps of pulverizing a scandia-stabilized zirconia sintered body to obtain a scandia-stabilized zirconia sintered powder having an average particle diameter (De) determined using a transmission electron microscope of more than 0.3 µm and not more than 1.5 µm, and an average particle diameter (Dr) determined by a laser scattering method of more than 0.3 µm and not more than 3.0 µm, and a ratio (Dr/De) of the average particle diameter determined by the laser scattering method to the average particle diameter determined using the transmission electron microscope of not less than 1.0 and not more than 2.5; preparing a slurry containing the scandia-stabilized zirconia sintered powder and a zirconia unsintered powder, wherein a percentage of the scandia-stabilized zirconia sintered powder to a sum of the scandia-stabilized zirconia sintered powder and the zirconia unsintered powder in the slurry is not less than 2 mass % and not more than 40 mass %; forming the slurry into a greensheet; and sintering the greensheet.

The scandia-stabilized zirconia sintered powder according to the present invention is characterized in that an average particle diameter (De) determined using a transmission electron microscope is more than 0.3 µm and not more than 1.5 µm; an average particle diameter (Dr) determined by a laser scattering method is more than 0.3 µm and not more than 3.0 µm; and a ratio (Dr/De) of the average particle diameter determined by the laser scattering method to the average particle diameter determined using the transmission electron microscope is not less than 1.0 and not more than 2.5.

The scandia-stabilized zirconia sheet according to the present invention is characterized in substantively comprising not less than 1.9 mass % and not more than 40 mass % of a component derived from the above scandia-stabilized zirconia sintered powder, or characterized in being produced from a zirconia unsintered powder and the above scandia-stabilized zirconia sintered powder, wherein a percentage of the scandia-stabilized zirconia sintered powder to a sum of the zirconia unsintered powder and the scandia-stabilized zirconia sintered powder is not less than 2 mass % and not more than 40 mass %.

The electrolyte sheet for a solid oxide fuel cell according to the present invention is characterized in comprising the scandia-stabilized zirconia sheet containing not less than 1.9 mass % and not more than 40 mass % of the above scandia-stabilized zirconia sintered powder according to the present invention. The solid oxide fuel cell according to the present invention is characterized in comprising the above scandia-stabilized zirconia sheet according to the present invention as an electrolyte sheet.

The process for production of a scandia-stabilized zirconia sintered powder according to the present invention is characterized in comprising the step of pulverizing a scandia-stabilized zirconia sintered body so that an average particle diameter (De) determined using a transmission electron microscope becomes more than 0.3 µm and not more than 1.5 µm, an average particle diameter (Dr) determined by a laser scattering method becomes more than 0.3 µm and not more than 3.0 µm, and a ratio (Dr/De) of the average particle diameter determined by the laser scattering method to the average particle diameter determined using the transmission electron microscope is not less than 1.0 and not more than 2.5.

DETAILED DESCRIPTION OF THE INVENTION

Hereinafter, the process for production of a scandia-stabilized zirconia sintered powder according to the present invention is described first.

1. Preparation of Zirconia Sintered Powder

In the process according to the present invention, a sintered body of scandia-stabilized zirconia is used as a raw material.

The scandia-stabilized zirconia means a zirconia containing $Sc_2O_3$ as a stabilizer. Zirconia stabilized by not less than 3 mol % and not more than 15 mol % of $Sc_2O_3$ is particularly used. It is desirable to use the scandia-stabilized zirconia stabilized desirably by not less than 4 mol % and not more than 13 mol % of $Sc_2O_3$, and more desirably by not less than 7 mol % and not more than 12 mol % of $Sc_2O_3$. The scandia-stabilized zirconia used for the present invention may contain other stabilizer as long as the scandia-stabilized zirconia contains $Sc_2O_3$. The stabilizer other than $Sc_2O_3$ is exemplified by an alkaline earth metal oxide such as MgO, CaO, SrO and BaO; a rare earth metal oxide such as $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Yb_2O_3$, and $Y_2O_3$; and an other metal oxide such as $SiO_2$, $TiO_2$, $Al_2O_3$, $Bi_2O_3$ and $In_2O_3$. The scandia-stabilized zirconia that contains not less than about 0.01 mass % and not more than about 5 mass % of $CeO_2$, $Al_2O_3$, $Gd_2O_3$, $TiO_2$ or $Bi_2O_3$, in addition to $Sc_2O_3$ is particularly desirable.

It is desirable to use the scandia-stabilized zirconia of which crystal structure (system) is cubic phase and/or rhombohedral phase. In general, crystal structures of zirconia are monoclinic, tetragonal, cubic and rhombohedral. The crystalline form of zirconia changes depending on a temperature and also changes according to the amount of a stabilizer to be added. For example, when a stabilizer is scandia and not less than about 3 mol % and not more than about 7 mol % of scandia is added to zirconia, such zirconia is partially-stabilized zirconia mainly composed of a tetragonal phase. When not less than about 7 mol % and not more than about 15 mol % of scandia is added to zirconia, the zirconia becomes fully stabilized zirconia mostly composed of a cubic phase or rhombohedral phase. In the present invention, fully stabilized zirconia may be just referred to stabilized zirconia in some cases.

In the present invention, cubic system and/or rhombohedral system of scandia-stabilized zirconia is desirably used. It is desirable to use a scandia-stabilized zirconia sintered body constituted with a cubic system and/or a scandia-stabilized zirconia sintered body constituted with a rhombohedral system as a raw material. Cubic and rhombohedral scandia-stabilized zirconias have an oxygen ion conductivity much higher than monoclinic and tetragonal scandia-stabilized zirconia. Thus, cubic and rhombohedral scandia-stabilized zirconias are suitable as a material for a solid electrolyte of a solid oxide fuel cell. In addition, since the strength of cubic and rhombohedral scandia-stabilized zirconia is lower than that of tetragonal scandia-stabilized zirconia, cubic and rhombohedral scandia-stabilized zirconia can be efficiently pulverized. Furthermore, since the amount of scandia added to zirconia in cubic and rhombohedral scandia-stabilized zirconia powders are larger than that in tetragonal scandia-stabilized zirconia powder, the cost advantage is high to recycle expensive scandia. The cubic system refers to a zirconia in which not less than 80% of the crystal structure is cubic phase. It is desirable to be a crystal form containing not less than 90% of cubic phase, and more desirably not less than 95% of cubic phase. Similarly, a rhombohedral system refers to a zirconia in which not less than 80% of the crystal form is rhombohedral phase. It is desirable to be a crystal form containing not less than 90% of rhombohedral phase, and more desirably not less than 95% of rhombohedral phase. The percentages of cubic phase and rhombohedral phase can be determined from the ratio of peak strengths of an X-ray diffraction chart. In the chart, a characteristic peak $2\theta=30.5°$ corresponding to cubic phase, a characteristic peak $2\theta=30.6°$ corresponding to rhombohedral phase, a characteristic peak $2\theta=28.2°$ corresponding to monoclinic phase, and a characteristic peak $2\theta=30.2°$ corresponding to tetragonal crystal are observed. In the present invention, a scandia-stabilized zirconia containing less than 50% of monoclinic phase is desirably used.

The scandia-stabilized zirconia sintered body as a raw material has once been sintered. The term "sintering" refers to binding particles to each other by heating a powder below the melting point or at around a temperature at which the powder partially melts, resulting in a formation of a dense and firm conjugate. In more detail, a scandia-stabilized zirconia sintered body is generally produced by heating a molded scandia-stabilized unsintered zirconia at or below the melting point, usually at not less than 1300° C. and not more than 1600° C., and desirably at not less than 1400° C. and not more than 1500° C. Thereby, a solid-state reaction and bonding between particles progress and scandia-stabilized zirconia is densified. Whether such densification is occurred or not can be determined based on comparing the density thereof with a theoretical density. A relative density of the sintered body used as a raw material in the present invention is desirably not less than 93%, and more desirably not less than 95%. The relative density refers to a relative value of the density determined by an Archimedes method to the theoretical density.

The range of the crystal particle diameters (grain sizes) measured on a magnified photograph on an etched surface of the scandia-stabilized zirconia sintered body taken using a scanning electron microscope (SEM) is desirably not less than 0.05 µm and not more than 30 µm, and the average is desirably not less than 0.1 µm and not more than 15 µm. The range is more desirably not less than 0.1 µm and not more than 20 µm, and most desirably not less than 0.3 µm and not more than 15 µm. The average is more desirably not less than 0.2 µm and not more than 10 µm, and most desirably not less than 1.0 µm and not more than 10 µm.

The shape of the raw material, scandia-stabilized zirconia sintered body, does not matter. However, it is desirable to use a sheet form of sintered body having a thickness of not more than 1 mm, and it is more desirable to use a sheet form of sintered body having a thickness of not more than 0.5 mm, since a thick or bulk-shaped sheet requires a large amount of energy to be pulverized and there is a concern to lower the overall production efficiency even if the used sintered body is a sheet.

A defective scandia-stabilized zirconia sintered body such as warped sintered body, and a broken scandia-stabilized zirconia sintered body can be used as a raw material.

A defective sheet of a scandia-stabilized zirconia sintered body can be used as a raw material. Furthermore, an electrolyte sheet derived from a solid oxide fuel cell can also be used as a raw material. The electrolyte sheet can be prepared by eluting electrodes from single cell. Such a sheet is desirable since a solid oxide fuel cell can be recycled.

Specifically, it is possible to use a damaged single cell or to use single cell obtained by removing a separator from a used solid oxide fuel cell stack. It is also possible to use single cell off format or a defective single cell. Of course, the shape of single cell does not matter, and a sheet having any shape such as sheet form, dimple form, film form and cylindrical form can be used as long as a scandia-stabilized zirconia sintered body is used as an electrolyte. In addition, the type of single cell may be an electrolyte supported type, an anode supported type or a cathode supported type.

In single cell, an anode is formed on one side of an electrolyte and a cathode is formed on the other side of the electrolyte. An intermediate layer may be formed between an electrolyte sheet and a cathode in some cases. The material of electrodes and an intermediate layer is exemplified by stabilized zirconia, a ceria oxide containing $Gd_2O_3$ and the like, a conductive material such as NiO, and perovskite structure oxide such as $LaMnO_3$. The components of electrodes and an intermediate layer can be eluted by an acid, except zirconia.

As an acid for elution, sulfuric acid, nitric acid and hydrochloric acid can be used. The concentration of sulfuric acid is desirably not less than 10 mass % and not more than 92 mass %, and more desirably not less than 20 mass % and not more than 80 mass %. The concentration of nitric acid is desirably not less than 2 mass % and not more than 98 mass %, and more desirably not less than 5 mass % and not more than 67 mass %. The concentration of hydrochloric acid is desirably not less than 3 mass % and not more than 37 mass %, and more desirably not less than 5 mass % and not more than 30 mass %.

Procedure of an elution using an acid is not particularly limited. For example, after single cell is coarsely ground into 1 mm or less, the ground cell is put into a container with an acid, and the mixture may be stirred or ultrasonicated. The amount of an acid to be used can be properly adjusted. For example, the amount of an acid may be set for 100 g of single cell as not less than about at 100 mL and not more than about 1000 mL, and desirably not less than about 200 mL and not more than 500 mL. The ultrasonication time can also be properly adjusted. For example, the ultrasonication time may be set as not less than about 10 minutes and not more than about 16 hours, and desirably not less than about 20 minutes and not more than about 3 hours.

Prior to the above elution process, it is possible to enhance the efficiency of the elution of electrode materials by making single cell smaller or finer by pulverizing the single cell. The method of pulverizing a scandia-stabilized zirconia sintered body according to the present invention described later can be used for the purpose.

The above treatment may be repeated two or more times. In other words, after finishing the above treatment and removing the eluent, the same treatment may be performed once more. More specifically, the above treatment is repeated until the concentrations of the components to be eluted in the eluting acid become not more than 500 ppm, desirably not more than 300 ppm, more desirably not more than 100 ppm, and most desirably not more than 50 ppm. The concentrations of the components in the eluate are measured by an ICP (inductively coupled plasma optical emission spectrometry).

When the electrode material of single cell contains ceria, it is desirable to perform an alkali treatment after the above acid treatment.

The alkali used in such an alkali treatment is exemplified by a sodium hydroxide solution, a potassium hydroxide solution and ammonia water. More specifically, the alkali is exemplified by a sodium hydroxide solution or a potassium hydroxide solution of not less than 1 N and not more than 10 N, more desirably not less than 1 N and not more than 5N; and ammonia water of not less than 5 mass % and not more than 35 mass %, desirably not less than 8 mass % and not more than 15 mass %.

The alkali treatment can be performed under the conditions same as the conditions of the above-described acid treatment other than substituting the acid with an alkali. However, when the electrolyte material contains ceria as well as scandia as a stabilizer, such as 10 mol % scandia 1 mol % ceria-stabilized zirconia, it is difficult to elute ceria by the alkali treatment since ceria is completely solid-dissolved in zirconia as well as scandia.

After removing the components of electrodes by the acid treatment or the alkali treatment following the acid treatment, it is desirable to thoroughly wash the obtained scandia-stabilized zirconia, which is solid electrolyte component, and then to dry. The water used for washing is not particularly limited, and tap water, well water, distilled water, pure water and ultrapure water can be used.

The scandia-stabilized zirconia sintered powder according to the present invention is characterized in having more than 0.3 μm and not more than 1.5 μm of an average particle diameter (De) determined using a transmission electron microscope, more than 0.3 μm and not more than 3.0 μm of an average particle diameter (Dr) determined by a laser scattering method, and not less than 1.0 and not more than 2.5 of a ratio (Dr/De) of the average particle diameter determined by the laser scattering method to the average particle diameter determined using the transmission electron microscope.

The scandia-stabilized zirconia sintered powder according to the present invention is prepared by pulverizing a scandia-stabilized zirconia sintered body so that the values of the average particle diameter determined using the transmission electron microscope (De), the average particle diameter determined by the laser scattering method (Dr) and the ratio (Dr/De) thereof become the desired values.

In an unsintered powder, two or more fine primary particles, which are the minimal particle units unbreakable without breaking the intermolecular bonds, aggregate by van der Waals forces and form a secondary particle.

In general, a zirconia powder is produced by calcining zirconium hydroxide which is obtained by coprecipitation, at about 800-1000° C. In such a powder, primary particles aggregate by van der Waals forces and form secondary particles, or primary particles loosely bond to each other to the extent that the primary particles do not become dense. Thus, a solid-state reaction has not occurred between primary particles unlike in sintered body. A zirconia unsintered powder has a low relative density, since there are gaps between the primary particles. In addition, the ratio of the average secondary particle diameter to the average primary particle diameter is relatively large.

On the other hand, a sintered powder is generally made by pulverizing a sintered body, in which primary particles and secondary particles bound to each other due to a solid-state reaction caused by sintering. Therefore, even if a scandia-stabilized zirconia sintered powder is observed with a transmission electron microscope or a laser microscope, grain boundaries of crystal grains are not visible. Thus, a sintered powder has a larger particle diameter, and is harder and denser than an unsintered powder. Although the scandia-stabilized zirconia sintered powder according to the present invention can aggregate as an unsintered powder, the degree of such an aggregation is much lower than that of the unsintered powder. Since the sintered powder of the present invention has been exposed to a temperature of 1300° C. or higher, the powder has an excellent thermal stability, particularly thermal hysteresis.

In the present invention, the term "average particle diameter (De) determined using a transmission electron microscope" refers to a particle diameter measured and calculated from a picture of scandia-stabilized zirconia sintered powders photographed using a transmission electron microscope. The average particle diameter is measured as follows. The zirconia sintered powder is supported on a copper mesh by a disperse suspension method, and observed under 4000× of magnification with a transmission electron microscope. The cumulative volumes of all the particles in the field are calculated, regarding all the particles in the field as spherical and assuming the maximum length of the particle in the X-axis direction as a diameter of the particle. The particles are ordered in the volume size thereof from small to large, and the diameter of the particle of which volume corresponds to 50% percentile of the cumulative volumes is defined as the average particle diameter (De). The measurement method using a transmission electron microscope is a standard method to measure the average particle diameter of primary particles of an unsintered powder. The reason why the average particle diameter is calculated not by a particle number-basis but by a particle volume-basis is that the average particle diameter determined by the laser scattering method described below is also defined by the diameter of the particle of which volume corresponds to 50% percentile of the cumulative volumes. Thereby, the standardization by volume makes the values more comparable, and a more accurate ratio can be obtained.

In the present invention, the term "average particle diameter (Dr) determined by a laser scattering method" is obtained from a particle size of the sintered powder, which value is measured by a particle size distribution measuring device using a laser. Specifically, a laser diffraction/scattering particle analyzer, "Particle Size Distribution Analyzer LA-920" manufactured by Horiba Ltd., is used. The dispersion medium to be used is an aqueous solution of sodium metaphosphate, in which 0.2 mass % of sodium metaphosphate dissolved as a dispersing agent in distilled water. To about 100 cm$^3$ of the dispersion medium, 0.01-0.5 mass % of a zirconia powder is added. The zirconia powder is dispersed by supersonic wave for 3 minutes. Then, the particle size distribution based on volume is measured by the device. The average particle diameter is defined as the particle diameter at 50 volume %, i.e. $D_{50}$, in the cumulative graph showing the measurement result of the distribution of the volume-based particle sizes. The measuring method by the laser scattering method is a standard method to measure the particle size distribution and the average particle diameter of secondary aggregated particles of an unsintered powder.

According to the inventors' findings based on experiments, when the average particle diameter (De) determined using the transmission electron microscope is not more than 0.3 μm or the average particle diameter (Dr) determined by a laser scattering method is not more than 0.3 μm with respect to the scandia-stabilized zirconia sintered powder according to the present invention, the formability and strength of the obtained scandia-stabilized zirconia sheet is improved. However, the sheet is easily warped and the pass rate for the sheet dimension test decreases. On the other hand, when the value of De exceeds 1.5 μm or the value of Dr exceeds 3.0 μm, the warp of the sheet is reduced and the pass rate for the sheet dimension test is improved. However, the sheet is not sintered satisfactorily and relative density becomes less than 98%. As a result, the strength of the sheet decreases.

The value of De is desirably more than 0.35 μm, and more desirably more than 0.4 μm. The value of De is desirably not more than 1.4 μm, more desirably not more than 1.2 μm, and most desirably not more than 1.0 μm. The value of Dr is desirably more than 0.35 μm, more desirably more than 0.4 μm. The value of Dr is desirably not more than 2.7 μm, more desirably not more than 2.4 μm, further more desirably not more than 1.2 μm, and most desirably not more than 0.8 μm.

In the present invention, the ratio (Dr/De) of the average particle diameter determined by the laser scattering method to the average particle diameter determined using the transmission electron microscope is set as not less than 1.0 and not more than 2.5. Since Dr and De are comparable based on volumes, the value of Dr/De indicates the degree of aggregation, i.e. dispersibility, of the scandia-stabilized zirconia sintered powder, as well as the degree of pulverization. When the value of Dr/De is 1.0, the sintered powder completely monodispersed without an aggregation. When the value of Dr/De exceeds 1.0, the sintered powder is partially aggregated. When the value of Dr/De exceeds 2.5, the degree of aggregation is large and coarse aggregated particles are formed.

According to the inventors' findings based on experiments, the smallest size of the scandia-stabilized zirconia sintered powder measured using a transmission electron microscope is about 0.05 μm. For this reason, it is considered that the fine sintered powder aggregates although the van der Waals force of the sintered powder is weaker than that of an unsintered powder. Less than 1.0 of Dr/De is supposed to imply, as a general concept, that the average secondary particle diameter is smaller than the average primary particle diameter. Therefore, the value of Dr/De is generally not less than 1.0.

In the case that the sintered powder having a value of Dr/De exceeding 2.5 is used, the thickness of the obtained scandia-stabilized zirconia sheet becomes uneven and deformation occurs. As a result, pass rate for the dimensional test becomes low. In addition, cracks occur, and the sheet strength becomes low. The value of Dr/De is desirably not less than 1.0 and not more than 2.0, and more desirably not less than 1.2 and not more than 1.8.

The scandia-stabilized zirconia sintered powder according to the present invention is produced by pulverizing a scandia-stabilized zirconia sintered body so that an average particle diameter (De) determined using a transmission electron microscope becomes more than 0.3 μm and not more than 1.5 μm, an average particle diameter (Dr) determined by a laser scattering method becomes more than 0.3 μm and not more than 3.0 μm, and a ratio (Dr/De) of the average particle diameter determined by the laser scattering method to the average particle diameter determined using the transmission electron microscope is not less than 1.0 and not more than 2.5.

According to the inventors' findings based on experiments, an excessive large amount of energy is necessary to pulverize a scandia-stabilized zirconia sintered body until the values of De or Dr become 0.3 μm or less. As a result, the productivity of producing the scandia-stabilized zirconia sheet is inferior. On the other hand, if the value of De is more than 1.5 μm or the value of Dr is more than 3.0 μm, a defect such as crack and warp occurs on the sheet. Furthermore, the relative density becomes less than 98% and the sheet strength becomes low, since sintering does not sufficiently proceed.

The method of pulverizing a scandia-stabilized zirconia sintered body is not particularly limited, and an ordinary method can be used. For example, it is possible to use a pulverizer such as a jaw crusher, a hammer crusher, a shredder, a roll crusher, a hammer mill, a cutting mill, a rod mill, a roller mill, a rotor mill, an impact smasher, a jet grinder, a ball mill, a beads mill, a colloid mill, a planet mill and a mortar. One of the pulverizers can be used alone, or two or more pulverizers can be used in combination.

To pulverize a sintered body efficiently, it is desirable to combine a dry pulverization and a wet pulverization. It is more desirable to conduct a coarse grinding by the dry-pulverization and then a fine milling by the wet-pulverization. It is also a desirable embodiment to carry out multiple stages of dry pulverization and/or multiple stages of wet pulverizations.

As a more desirable embodiment, a scandia-stabilized zirconia sintered body is first coarsely dry-pulverized until the average particle diameter (Dr) determined by the laser scattering method becomes more than 3.0 μm and not more than 2000 μm. Then, the coarse sintered powder is finely wet-pulverized until the powder has the desired average particle diameter (De) determined using the transmission electron microscope, the average particle diameter (Dr) determined by the laser scattering method, and Dr/De. It is possible to pulverize a sintered body only by a dry pulverization so that the Dr becomes not more than 3.0 μm. However, it may take a large amount of time and energy. If the dry pulverization is finished while Dr exceeds 2000 μm, a fine milling might not be achieved satisfactorily by the next wet pulverization. Thus, it might not be efficient. Accordingly, the pulverization can be more efficient by performing the coarse grinding in a dry condition and then performing the fine milling in a wet condition. The reason why the value of Dr is used as an indicator of the degree of pulverization is because it is easy to measure an apparent average particle diameter as a standard.

A dry pulverization refers to a method of pulverizing without using a dispersion medium such as water and alcohol. Since a scandia-stabilized zirconia sintered body to be pulverized has high hardness, the blade, rotor or hammer of a pulverizer is rotated at a high rotational speed. It is therefore desirable to select a device that can rotate a blade, a rotor or a hammer at about not less than about 100 rpm and not more than about 30000 rpm, particularly not less than about 1000 rpm and not more than about 20000 rpm of the rotational speed.

Furthermore, it is desirable to perform a dry pulverization with at least two different stages in which each of rotation speeds is different each other. For example, a primary dry pulverization is performed at not less than 2000 rpm and not more than 20000 rpm until the value of Dr becomes not less than about 100 μm and not more than about 3000 μm. During the process, in order to avoid a contamination of ultra-coarse particles that have not been sufficiently pulverized, it is desirable to select the particles by sieving operation through a mesh of not less than about 0.5 mm and not more than about 3 mm. Thereby, the efficiency of pulverization is improved. Next, a secondary dry pulverization is performed at not less than 6000 rpm and not more than 30000 rpm until the value of Dr becomes more than about 3.0 μm and not more than about 2000 μm. During the process, it is also desirable to avoid a contamination of large coarse particles by sieving operation with a mesh of not less than about 0.2 mm and not more than about 2 mm. A wet pulverization may also be performed with at least two stages. For example, a wet pulverization is performed using a ball mill first, and then another wet pulverization may be performed by a bead mill. The rotational speed of a pulverizer can be adjusted based on the size of the used machine and the like. For example, when the pulverizer is large, the rotational speed is generally decreased.

During a dry pulverization, due to abrasion of a grinding medium, a grinding blade and a rotor, there is a possibility that iron, chromium or the like contaminates in the pulverized zirconia powder. In such cases, it is desirable to remove the contaminated impurities with a magnet or by an acid washing. The machine for performing a dry pulverization is exemplified by a dry jet mill, a hammer crusher, a hammer mill, a cutting mill, a roller mill, a rotor mill, a vibrating mill, a ball mill and a bead mill. The scandia-stabilized zirconia sintered body is grinded until De, Dr and Dr/De becomes the desired values while the rotational speed of the machines and the grinding time are adjusted. As a result, the zirconia sintered powder can be obtained. As a grinding medium, it is desirable to use the one made of zirconia to prevent a contamination of foreign substances.

A wet pulverization is milling with using a dispersion medium such as water and alcohol. The machine to perform a wet pulverization is exemplified by a ball mill, a bead mill, a planetary mill, a wet jet mill and a homogenizer. The scandia-stabilized zirconia sintered body is pulverized until De, Dr and Dr/De becomes the desired values while the rotational speed of the machines, the duration of milling time and milling mediums used in a mill, such as balls and beads, are adjusted. As a result, the zirconia sintered powder can be obtained. As milling mediums, it is desirable to use the one made of zirconia to prevent a contamination of foreign substances. In addition, it is desirable to use the milling mediums having not less than 0.01 mmϕ and not more than 3 mmϕ, more desirably not less than 0.05 mmϕ and not more than 2 mmϕ, and most desirably not less than 0.1 mmϕ and not more than 1 mmϕ of a diameter. When zirconia beads having not less than 0.01 mmϕ of diameter are used, separation of a large coarse sintered powder and the zirconia beads becomes very easy. Thus, the recovery rate of the scandia-stabilized zirconia sintered powder obtained by milling is increased. On the other hand, if the used zirconia bead is too large, there is a concern that milling efficiency is decreased and the yield of the fine sintered powder can be decreased. Thus, it is desirable to use the bead of which diameter is not more than 3 mmϕ.

After wet-pulverizing a scandia-stabilized zirconia sintered body, it is desirable to spray-dry the pulverized scandia-stabilized zirconia sintered powder. More specifically, if necessary, the solid concentration in the dispersion after wet pulverization is adjusted to be not less than 10 mass % and not more than 60 mass %. Then, the scandia-stabilized zirconia sintered powder is dried by a hot air at not less than about 100° C. and not more than about 350° C. For the process, a suitable amount of dispersant may be added.

The spray dry is suitable for a large scale processing. Thus, the spray dry is useful for the industrial-scale mass production of the scandia-stabilized zirconia sintered powder and the scandia-stabilized zirconia sheet according to the present invention. In addition, from the inventors' finding based on experiments, the scandia-stabilized zirconia sintered powder obtained by the spray dry has an excellent fluidity.

It is possible to use a rest angle as an indicator of the fluidity of the scandia-stabilized zirconia sintered powder of the present invention. In general, a powder having a smaller rest angle has a superior fluidity. It is desirable that the scandia-stabilized zirconia sintered powder of the present invention has not less than 15° and not more than 50° of a rest angle. When the rest angle is not less than 15°, the flow of the powder is superior and the fly-off of the powder is well prevented during handling. When the rest angle is more than 50°, the flow of the powder is unsatisfactory and the conveyance of the powder may be difficult in an industrial mass production. The rest angle is more desirably not less than 20°, further more desirably not less than 22°, and most desirably not less than 25°. The rest angle is more desirably not more than 45°, further more desirably not more than 40°, and most desirably not more than 35°. When the scandia-stabilized zirconia sintered body is wet-pulverized and then, the spray-drying is carried out, it becomes easy to obtain the powder having a rest angle within the above-described range.

In the present invention, the rest angle is determined by dropping the powder specimen from an orifice, such as funnel, onto a horizontal flat plate and measuring the angle of the slope of the cone formed of the deposited powder specimen using a protractor.

When the scandia-stabilized zirconia sintered powder according to the present invention is used, it is possible to facilitate the recycle of a sintered body containing zirconia stabilized by expensive scandia. In addition, by using the scandia-stabilized zirconia sintered powder of the present invention as a raw material, a scandia-stabilized zirconia sheet can be produced with excellent productivity and reproducibility. Hereinafter, the process for production of a scandia-stabilized zirconia sheet employing the scandia-stabilized zirconia sintered powder according to the present invention is described.

2. Preparation of Slurry

In the process for production of a scandia-stabilized zirconia sheet according to the present invention, a slurry containing the scandia-stabilized zirconia sintered powder and a zirconia unsintered powder, wherein a percentage of the scandia-stabilized zirconia sintered powder to a sum of the scandia-stabilized zirconia sintered powder and the zirconia unsintered powder in the slurry is not less than 2 mass % and not more than 40 mass %, is prepared. The percentage is desirably not less than 3 mass % and not more than 30 mass %, and more desirably not less than 5 mass % and not more than 25%. A conventional method can be used to prepare the slurry. For example, the above raw material zirconia powders, a solvent, a binder, a dispersant and a plasticizer are mixed.

The powder mixture containing the above zirconia sintered powder and a zirconia unsintered powder is used as a raw material. Though the reason is still not clear, according to the inventors' findings based on experiments, when the above powder mixture is used, the strength of the obtained zirconia sheet is increased compared to the zirconia sheet obtained by using only a zirconia sintered powder or only a zirconia unsintered powder is used as a raw material. In addition, the shrinkage of the zirconia sheet by sintering is reduced and the dimensional uniformity is improved as well as the warp of the sheet is reduced. As a result, the productivity of the sheet is remarkably improved.

In the present invention, the zirconia unsintered powder refers to a zirconia powder that has not been sintered yet. Usually, a commercially available zirconia unsintered powder is produced as follows. First, zirconium hydroxide or a zirconium gel is obtained by coprecipitation method, sol-gel method or hydrolysis method, and then dried. Then, the dried zirconium hydroxide or the zirconium gel is calcined at about 600-1200° C., desirably at about 800-1000° C. Based on necessity, the calcined zirconia powder is agglomerated into a granule by spray-drying. Since the zirconia unsintered powder has been just calcined at 1200° C. or lower and has not been sintered, fine primary particles of the zirconia unsintered powder either aggregate and form secondary particles by van Der Waals force or weakly bind to each other without densification. At least, unlike a sintered body, a solid-state reaction between the primary particles is rarely occurred.

It is possible to vary the particle diameter of a zirconia unsintered powder at a certain degree by adjusting the producing conditions. However, the particle diameter of the zirconia unsintered powder generally does not become as large as that of a zirconia sintered powder, which has been subjected to a sintering process. In general, the average primary particle diameter of a zirconia unsintered powder determined using the transmission electron microscope is not less than about 0.005 μm and not more than about 0.15 μm, and the average secondary particle diameter determined by the laser scattering method is generally not less than about 0.1 μm and not more than about 1 μm. The ratio of the average secondary particle diameter of the zirconia unsintered powder determined by the laser scattering method to the average primary particle diameter determined using the transmission electron microscope is quite large, and usually not less than 3, and mostly not less than 5.

In the present invention, the percentage of the zirconia sintered powder to the mixture of the zirconia sintered powder and the zirconia unsintered powder is not less than 2 mass % and not more than 40 mass %. Although the reason is not clear, according to the inventors' finding based on experiments, the zirconia sheet made from the powder having the above percentage has superiority particularly in strength and compactness.

In the present invention, in addition to the zirconia sintered powder and the zirconia unsintered powder, a powder made of alumina, titania, niobium oxide, thallium oxide or the like may also be added. The amount of such a third powder to be added is desirably not less than 0.01 mass % and not more than 5 mass %, more desirably not less than 0.1 mass % and not more than 3 mass % to the sum of the constituents of the raw material powders.

The kind of a binder used for the slurry is not particularly limited, and a suitable binder may be selected to be used from conventionally known organic binders. An organic binder is exemplified by an ethylene copolymer, a styrene copolymer, a (meth)acrylate copolymer, a vinyl acetate copolymer, a maleic acid copolymer, a vinyl butyral resin, a vinyl acetal resin, a vinyl formal resin, a vinyl alcohol resin, a wax and a cellulose resin such as ethyl cellulose. Among the examples, a thermoplastic (meth)acrylate copolymer having 20,000-250,000, more desirably 50,000-200,000 of a number average molecular weight, is desirably used, since a (meth)acrylate copolymer is superior in formability and punch processability of zirconia greensheet. In addition, high strength of the greensheet can be obtained, and inconsistent shrinkage is well prevented.

The ratio of a binder to the raw material zirconia powders is desirably not less than 5 mass parts and not more than 30 mass parts to 100 mass parts of the raw material zirconia powders, and more desirably not less than 10 mass parts and not more than 20 mass parts to 100 mass parts of the raw material zirconia powders. If the amount of the binder is insufficient, formability of the zirconia greensheet may become unsatisfactory, and strength and flexibility of the zirconia greensheet decreases. If the amount of the binder is excessive, not only is it difficult to control the viscosity of the slurry, but also the decomposition emission of the binder during degreasing and sintering is intense. It may result in an inconsistent shrinkage and the dimensional accuracy may decrease. Furthermore, the thermal decomposition of the binder may be insufficient, and some of the binder component may remain in the sheet as a residual carbon.

The solvent for the slurry is exemplified by water; an alcohol such as methanol, ethanol, 2-propanol, 1-butanol and 1-hexanol; a ketone such as acetone and 2-butanone; an aliphatic hydrocarbon such as pentane, hexane and heptane; an aromatic hydrocarbon such as benzene, toluene, xylene and ethylbenzene; an acetic acid ester such as methyl acetate, ethyl acetate and butyl acetate. The solvents can be used alone, or two or more solvents can be used in combination. It is desirable to adjust the amount of the solvent to be used by watching the viscosity of the slurry. The viscosity of the slurry is set as desirably not less than 1 Pa·s and not more than 50 Pa·s binders, and more desirably not less than 2 Pa·s and not more than 20 Pa·s.

For the preparation of the slurry, it is desirable to use a dispersant to facilitate the dispersion of the zirconia raw material powders. The dispersant is exemplified by a polymeric electrolyte such as poly(acrylic acid) and poly(ammonium acrylate); a partial ester such as α-olefin/maleic anhydride copolymer; an organic acid such as citric acid and tartaric acid; a copolymer of maleic anhydride with isobutylene or styrene, the ammonium salt or amine salt thereof; a copolymer of butadiene and maleic anhydride or the ammonium salt thereof.

In order to improve the formability of the slurry, it is desirable to add a plasticizer to the slurry. The plasticizer is exemplified by a phthalate such as dibutyl phthalate and dioctyl phthalate; a glycol or a glycol ether, such as propylene glycol; and a polyester such as a polyester phthalate, a polyester adipate and a polyester sebacate. Moreover, a surfactant or a defoaming agent can be added to the slurry if necessary.

The slurry is prepared by mixing the above-described components with a desired ratio. During the preparation, the components may be blended with pulverizing some powders by a ball mill to make the particles finer or the particle diameter more uniform. The order of mixing the components is not particularly limited, and the standard method may be used.

3. Forming

The obtained slurry is formed into a sheet shape. The forming method is not particularly limited. For example, a sheet shape having an appropriate thickness is obtained by using a doctor blade method or extrusion method. The sheet shape in the present invention also includes a cylindrical shape or a ring shape formed by rounding or rolling up a sheet.

Then, by drying, the formed sheet, i.e. zirconia greensheet, is obtained. The conditions of drying are not particularly limited. For example, the formed sheet may be dried at a constant temperature of from room temperature to 150° C., or the drying temperature may be raised continuously or in stepwise such as 50° C., 80° C. and then 120° C.

The obtained zirconia greensheet may be punched or cut into an appropriate size. The shape of the greensheet may be any of, for example, round, oval, rectangular or rectangular having R. Furthermore, the greensheet may have one or plural holes having a shape of circular, oval, rectangular, or rectangular having R. The thickness of the greensheet is not particularly limited. For example, the thickness can be set as not less than 35 μm and not more than 1000 μm. Also, the area of the greensheet is not particularly limited. For example, the area can be set as not less than 5 cm$^2$ and not more than 2000 cm$^2$.

The surface roughness of the zirconia greensheet depends on the zirconia powders used as a raw material and the particle size distribution of the particles in the slurry. However, in a case of a tape casting by a doctor blade method, the surface roughness can be relatively easily adjusted. For example, the surface roughness is adjusted by casting the slurry on a roughened PET film, or by pressing the greensheet with a surface-roughened sheet or metallic mold after casting. Even when the ceramic greensheet is obtained by a extrusion molding method, the surface roughness can be similarly adjusted. In general, the surface roughness of the ceramic greensheet is desirably not less than 0.01 μm and not more than 6 μm as Ra.

4. Sintering

Next, the obtained formed greensheet is sintered. A conventional method can be used for sintering.

For example, it is possible to load one formed greensheet on each setter plate to fire. However, for mass production, it is desirable to stack the formed greensheets and porous spacer sheets one by one on a setter plate and to fire the stack. The stack may be configured by placing a spacer sheet at the bottom, stacking the zirconia greensheets and the spacer sheets one by one, and placing a spacer sheet at the top. The spacer sheet at the bottom prevents the adhesion of the zirconia greensheet to the setter plate. The spacer sheet at the top functions as a weight and reduces warps and waviness of zirconia sheets.

The sintering condition is not particularly limited, and a conventional condition may be used. For example, the greensheet may be heated at 150-600° C., desirably 250-500° C. for about 5-80 hours to remove organic components such as binder and plasticizer from the formed sheet. Then, the greensheet may be sintered by firing at 1300-1600° C., desirably 1400-1500° C. for 2-10 hours.

The scandia-stabilized zirconia sheet produced by the above process according to the present invention has high strength. More specifically, the three-point flexural strength of the scandia-stabilized zirconia sheet produced by the above-described process is not less than 0.35 GPa.

The size of the scandia-stabilized zirconia sheet of the present invention may be adjusted based on purpose. For example, the thickness of the scandia-stabilized zirconia sheet may be not less than 0.03 mm and not more than 0.5 mm, and desirably not less than 0.1 mm and not more than 0.3 mm; and the planar section area thereof may be not less than 1 cm$^2$ and not more than 1000 cm$^2$, desirably not less than 50 cm$^2$ and not more than 800 cm$^2$, and most desirably not less than 100 cm$^2$ and not more than 500 cm$^2$.

The scandia-stabilized zirconia sheet produced by the present invention process is very dense. Specifically, the relative density, which is measured by the Archimedes method, relative to the theoretical density is not less than 98%.

The scandia-stabilized zirconia sheet according to the present invention is made from the scandia-stabilized zirconia sintered powder and a zirconia unsintered powder as raw material powders. In the production process, the percentage of the scandia-stabilized zirconia sintered powder to the sum of the scandia-stabilized zirconia sintered powder and a zirconia unsintered powder is set as not less than 2 mass % and not more than 40 mass %. The greensheet is prepared from a slurry containing the powder mixture. During sintering, constituents other than the raw material powders are removed. Therefore, the scandia-stabilized zirconia sheet of the present invention substantially contains not less than 1.9 mass % and not more than 40 mass % of the component derived from the scandia-stabilized zirconia sintered powder in the total weight of the scandia-stabilized zirconia sheet.

As described above, the scandia-stabilized zirconia sheet of the present invention has high strength and denseness. Therefore, it is possible to make the zirconia sheet large and thin. As a result, the zirconia sheet of the present invention is optimal as an electrolyte sheet for a solid oxide fuel cell. The solid oxide fuel cell can efficiently generate electric power and has a long durability.

In order to prepare single cell of a solid oxide fuel cell using the scandia-stabilized zirconia sheet of the present invention as an electrolyte, a conventional method may be used. Specifically, an anode is formed on one side of the scandia-stabilized zirconia sheet of the present invention, and a cathode is formed on the other side. If necessary, an intermediate layer is provided on one side or both sides of the electrolyte sheet to prevent a reaction between the materials of the electrolyte and the anode or the cathode. It is desirable to provide a surface roughness on the surface of the electrolyte sheet for an anchor effect to enhance the adhesion between the electrolyte sheet and the anode layer, the cathode layer or the intermediate layer for preventing the layers from peeling off from the electrolyte. Such roughness, as Ra, is desirably not less than 0.1 μm and not more than 3 μm, more desirably not less than 0.3 μm and not more than 2 μm, and further more desirably not less than 0.5 μm and not more than 1.5 μm.

As the material suitably used for an anode, in general, a cermet of Ni, Co or Ru, and stabilized zirconia and ceria oxide are desirably used. In particular, a cermet composed of Ni and 9-12 mol % $Sc_2O_3$-stabilized zirconia is desirable. The anode material is kneaded into a paste with a binder such as ethyl cellulose, and a solvent such as α-terpineol. Alternatively, the anode material is milled into a slurry. An anode is formed by coating the paste or the slurry on the electrolyte sheet by screen-printing method or coating method. Then, the sheet is dried and fired to form an anode.

The material used for a cathode is exemplified by a perovskite type structure oxide having a basic structure of $LaMnO_3$, $LaCoO_3$ or $LaFeO_3$, and a mixture of the perovskite structure oxide to which stabilized zirconia and/or ceria oxide is added. In particular, a mixture of $La_{0.6}Sr_{0.4}CO_{0.2}Fe_{0.8}O_3$ or $LaNi_{0.6}Fe_{0.4}O_3$ to which 9-12 mol % $Sc_2O_3$-stabilized zirconia is added is desirably used. Similarly to the case of an anode, a cathode can be formed by preparing a paste or a slurry, coating the paste or slurry on the opposite side of the electrolyte sheet where an anode, is formed by screen-printing method or coating method, drying and firing.

The order of forming an anode, and a cathode is not particularly limited. An intermediate layer composed of a ceria oxide may be provided between the solid electrolyte and the cathode to prevent a solid-state reaction between the layers. Furthermore, an anode contact layer or a cathode contact layer may be provided on an anode or a cathode respectively.

The scandia-stabilized zirconia sheet according to the present invention has high strength and denseness. Thus, the solid oxide fuel cell having the sheet as an electrolyte sheet has a superior durability, thermal stability and thermal hysteresis characteristics. Also, according to the present invention process, such a scandia-stabilized zirconia sheet is efficiently produced with reducing a defect such as warp and failure of dimensional test. Furthermore, the present invention enables to recycle defective scandia-stabilized zirconia sheets as well as scandia-stabilized zirconia sheets collected from used solid oxide fuel cells. Thus, the present invention is very economical. Therefore, the present invention contributes to the practical realization of a solid oxide fuel cell.

EXAMPLES

Hereinafter, the present invention is further described in detail with Examples. However, the present invention is not limited by the following Examples. It is possible to practice the present invention with suitably modifying the Examples according to the contents of the specification. Such a modification is included in the scope of the present invention.

The methods of testing the properties of scandia-stabilized zirconia powders and sintered sheets were as follows.

Test Example 1

Measurement of Average Particle Diameter Using Transmission Electron Microscope

A copper mesh was treated to be hydrophilic by coating with a collodion film, drying and carbon-shadowing. The zirconia sintered powder to be tested was dispersed in water to obtain a suspension. The suspension was placed on the above copper mesh and dried. Thereby, specimen for measurement was obtained.

The specimen was observed using a transmission electron microscope (model H-7650 manufactured by Hitachi High-Technologies Corporation) under 4000× of magnification. The cumulative volume of all the particles in the field was calculated, regarding all the particles in the field as sphere and the maximum length of each particle in X-axis direction as the diameter thereof. The particles were ranked from smallest to largest in volume, and the particle diameter of the particle corresponding to a 50 percentile of the cumulative volumes was defined as the average particle diameter using a transmission electron microscope.

Test Example 2

Measurement of Average Particle Diameter by Laser Scattering Method

To a 0.2 mass % sodium metaphosphate solution (approximately 100 $cm^3$) as a dispersant, 0.01-0.5 mass % of the zirconia sintered powder obtained by pulverizing a scandia-stabilized zirconia sintered body was added. The powder was dispersed by sonicating for 3 minutes. The particle size distribution on the basis of a volume in the dispersion was measured using a laser diffraction/scattering particle analyzer 'LA-920' manufactured by Horiba Ltd. Based on the measurement result of the particle size distribution on the basis of a volume, the particle diameter at 50 volume % in the cumulative graph, i.e. $D_{50}$, was defined as the average particle diameter by a laser scattering method.

Test Example 3

Measurement of Specific Surface Area of Zirconia Powder

The specific surface area of zirconia powder was measured by BET method using nitrogen as an adsorbent molecule. As the measuring device, Macsorb HM-1210 manufactured by Mountech Co. was used. Measurements were performed at three points per sample, and the average value thereof was defined as the specific surface area.

Test Example 4

Three-Point Flexural Strength Test of Sintered Zirconia Sheet

The obtained zirconia greensheet was cut into a rectangular shape. The sheet was fired at 1400° C. for 3 hours. Thereby, twenty rectangular specimens having 5 mm×50 mm dimension were produced. Using a universal testing machine (manufactured by Instron Co., model 4301), three-point flexural strength was measured at 20 mm span and 0.5 mm/min of crosshead speed according to JIS R1601. The average of the measured values was defined as three-point flexural strength.

Test Example 5

Measurement of Rest Angle of Zirconia Powder

The rest angle of zirconia powder was measured using a powder rest angle meter (AS ONE Corporation, ASK-01). Specifically, the sample powder was dropped onto the bottom plate from the hopper of the measuring machine. Then, the angle of the slope of the cone formed by deposition was measured by a protractor. The measurements were done twice, and the average of the measured values was defined as the rest angle.

Production Example 1

(1) Production of Conventional Scandia-Stabilized Zirconia Sheet

The average particle diameter (De) by the transmission electron microscope, the average particle diameter (Dr) by the laser scattering method and the specific surface area of a commercially available scandia-stabilized zirconia unsintered powder (product of Daiichi Kigenso Kagaku Kogyo Co., Ltd., product name: 10Sc1CeSZ, hereinafter referred as '10Sc1CeSZ unsintered powder') were measured as described in the above Test Examples 1-3. The crystal system was determined by X-ray diffraction analysis. As a result, the value of De was 0.09 µm, Dr was 0.60 µm, and the specific surface area was 10.8 $m^2/g$. The powder was mostly composed of cubic phase, and the percentage of cubic phase was 99.9%.

Using a ball mill, 100 mass parts of 10Sc1CeSZ unsintered powder, 50 mass parts of toluene as a solvent, and 2 mass parts of sorbitan fatty acid ester surfactant as a dispersant were milled and mixed. To the mixture, 18 mass parts (solid basis) of methacrylate copolymer (number average molecular weight: 100,000, glass transition temperature: −8° C., solid concentration: 50%) as a binder and 3 mass parts of dibutyl phthalate as a plasticizer were added. The mixture was further mixed using the ball mill to obtain a slurry. The slurry was concentrated and degassed so that the viscosity at 25° C. became 3 Pa·s. The obtained slurry was used as a coating slurry.

The coating slurry was coated on a PET film by doctor blade method. The PET film was passed inside of a drier having three temperature zones of 50° C., 80° C. and 110° C. at a speed of 0.2 m/min. Then, the PET film was cut by 150 mm of width with a slitter, to obtain a long zirconia greensheet having 280 µm of thickness and 200 m of length. The obtained long zirconia greensheet was cut, and one thousand eight hundreds zirconia greensheets having a square shape of 135 mm×135 mm were obtained.

A stack was made as follows. Two 150 mm×150 mm square-shaped porous alumina sheets (porosity: 45%, thickness: 0.2 mm) were stacked. One zirconia greensheet was stacked on the stacked two porous alumina sheets, and then one porous alumina sheet was further stacked on the zirconia sheet as a spacer. Furthermore, the zirconia greensheets and porous sheets were alternately stacked so that nine the zirconia sheets and nine porous sheets were stacked in total. Four stacks were placed on a setter plate (thickness 20 mm, 500 mm×500 mm). A weight jig made of millite-alumina (porosity: 60%, bulk density: 1.3) was placed on each stack. Likewise, total two hundreds stacks, each containing nine zirconia greensheets, were prepared. The stacks were sintered in the atmosphere at 1400° C. for 3 hours. Thereby, one thousand eight hundreds 10Sc1CeSZ sintered sheets having about 100 mm×100 mm square shape and 250 µm of thickness were produced.

(2) Production of Zirconia Sintered Powder

The square-shaped 10Sc1CeSZ sintered sheets obtained in the above Production Example 1(1) and φ 20 mm zirconia balls were put into a 50 L ball mill (Chuo Kakoki Co. Ltd., MR-50). The sheets were dry-pulverized at 45 rpm for 2 hours. Thereby, a primary dry-pulverized zirconia sintered powder having 1000 µm of an average particle diameter (Dr) determined by the laser scattering method was obtained. The obtained primary dry-pulverized zirconia sintered powder and φ 5 mm zirconia balls were put into a dry-type bead mill (manufactured by Ashizawa Finetech Co., Drystar-SDA5), and the primary powder was dry-pulverized at 660 rpm for 45 minutes. Thereby, a secondary dry-pulverized zirconia sintered powder having 5.3 µm of an average particle diameter (Dr) determined by the laser scattering method was obtained. Next, the obtained secondary dry-pulverized zirconia sintered powder, ethanol and φ 0.3 mm zirconia balls were put into a bead mill (manufactured by Ashizawa Finetech Co., wet-type fine pulverizing/stir device 'Star mill'), and wet-pulverization was performed at 3800 rpm for 2 hours and 30 minutes. The pulverized powder was dried with a spray-dryer, to obtain the scandia-stabilized zirconia sintered powder A, having De: 0.41 µm, Dr: 0.42 µm, and Dr/De: 1.02.

Similarly to the above, using the square-shaped 10Sc1CeSZ sintered sheets obtained in the above Production Example 1, scandia-stabilized zirconia sintered powders B-J were obtained in the conditions that the pulverizers, rotational speeds, duration times of rotation, grinding media and dispersants were changed as shown in Tables 1-1 and 1-2.

TABLE 1-1

| Batch | | Pulverizer | Grinding Medium | Rotational Speed | Duration Time | Dr | Wet Pulverization |
|---|---|---|---|---|---|---|---|
| A | Primary Pulverization | Ball Mill | 20 mmφ Zirconia Ball | 80 rpm | 2 hr | | Primary Pulverization |
|   | Secondary Pulverization | Bead Mill | 5 mmφ Zirconia Ball | 660 rpm | 45 min | 5.3 µm | Secondary Pulverization |
| B | Primary Pulverization | Ball Mill | 20 mmφ Zirconia Ball | 80 rpm | 2 hr | | Primary Pulverization |
|   | Secondary Pulverization | Bead Mill | 5 mmφ Zirconia Ball | 660 rpm | 45 min | 5.3 µm | Secondary Pulverization |
| C | Primary Pulverization | Ball Mill | 20 mmφ Zirconia Ball | 80 rpm | 10 hr | | Primary Pulverization |
|   | Secondary Pulverization | Bead Mill | 5 mmφ Zirconia Ball | 660 rpm | 45 min | 3.6 µm | Secondary Pulverization |
| D | Primary Pulverization | Ball Mill | 20 mmφ Zirconia Ball | 80 rpm | 10 hr | | Primary Pulverization |
|   | Secondary Pulverization | Bead Mill | 5 mmφ Zirconia Ball | 660 rpm | 45 min | 3.6 µm | Secondary Pulverization |
| E | Primary Pulverization | Planet Mill | 20 mmφ Zirconia Ball | 200 rpm | 0.5 hr | | Primary Pulverization |
|   | Secondary | Planet | 5 mmφ | 200 rpm | 0.5 hr | 5.74 µm | Secondary |

TABLE 1-1-continued

| | | | Wet Pulverization | | | | Drying |
|---|---|---|---|---|---|---|---|
| Batch | Pulverizer | Dispersant | Milling Medium | Rotational Speed | Duration Time | Dr | Method Drier |
| A | Bead Mill | Ethanol | 0.3 mmφ Zirconia Bead None | 3800 rpm | 2.5 hr | 0.42 μm | Spray Drier |
| B | Bead Mill | Water | 0.3 mmφ Zirconia Bead None | 3800 rpm | 2.5 hr | 0.42 μm | Spray Drier |
| C | Bead Mill | Ethanol | 0.1 mmφ Zirconia Bead None | 3800 rpm | 2.5 hr | 0.42 μm | Spray Drier |
| D | Bead Mill | Ethanol | 0.1 mmφ Zirconia Bead None | 3800 rpm | 0.5 hr | 0.42 μm | Spray Drier |
| E | | | None | | | | |

TABLE 1-2

| | | | Dry Pulverization | | | | |
|---|---|---|---|---|---|---|---|
| Batch | | Pulverizer | Grinding Medium | Rotational Speed | Duration Time | Dr | Wet Pulverization |
| F | *Primary Pulverization | Planet Mill | 20 mmφ Zirconia Ball | 200 rpm | 0.5 hr | | Primary Pulverization |
| | Secondary Pulverization | | None | | | | Secondary Pulverization |
| G | *Primary Pulverization | Planet Mill | 20 mmφ Zirconia Ball | 200 rpm | 0.5 hr | | Primary Pulverization |
| | Secondary Pulverization | | None | | | | Secondary Pulverization |
| H | *Primary Pulverization | Planet Mill | 20 mmφ Zirconia Ball | 200 rpm | 0.5 hr | | Primary Pulverization |
| | Secondary Pulverization | Planet Mill | 5 mmφ Zirconia Ball | 200 rpm | 0.5 hr | 6.2 μm | Secondary Pulverization |
| | Tertiary Pulverization | Planet Mill | 0.8 mmφ Zirconia Bead | 200 rpm | 0.5 hr | 4.56 μm | Tertiary Pulverization |
| I | Primary Pulverization | Ball mill | 20 mmφ Zirconia Ball | 80 rpm | 10 hr | | Primary Pulverization |
| | Secondary Pulverization | Bead mill | 5 mmφ Zirconia Ball | 660 rpm | 45 min | 3.6 μm | Secondary Pulverization |
| J | Primary Pulverization | Planet Mill | 20 mmφ Zirconia Ball | 200 rpm | 0.5 hr | | Primary Pulverization |
| | Secondary Pulverization | Planet Mill | 5 mmφ Zirconia Ball | 200 rpm | 0.5 hr | 6.2 μm | Secondary Pulverization |

| | | | Wet Pulverization | | | | Drying |
|---|---|---|---|---|---|---|---|
| Batch | Pulverizer | Dispersant | Milling Medium | Rotational Speed | Duration Time | Dr | Method Drier |
| F | Planet Mill | Ethanol | 5 mmφ Zirconia Ball | 200 rpm | 0.5 hr | 5.1 μm | Hot Air Circulation |
| | Planet Mill | Ethanol | 0.3 mmφ Zirconia Bead | 200 rpm | 3 hr | 2.05 μm | Drier |
| G | Planet Mill | Ethanol | 5 mmφ Zirconia Ball | 200 rpm | 0.5 hr | 5.1 μm | Hot Air Circulation |
| | Planet Mill | Ethanol | 0.3 mmφ Zirconia Bead | 200 rpm | 2 hr | 2.66 μm | Drier |
| H | | | None | | | | Not Used |
| I | Bead Mill | Ethanol | 0.1 mmφ Zirconia Bead None | 3800 rpm | 5 hr | 0.42 μm | Hot Air Circulation Drier |
| J | Planet Mill | Water | 0.3 mmφ Zirconia Bead None | 200 rpm | 4 hr | 4.67 μm | Hot Air Circulation Drier |

*Sieved to 75 μm or below after primary pulverization

(3) Production of Zirconia Sintered Sheet

In a similar conditions to the above Production Example 1(1) except that a mixture of the zirconia unsintered powder and the scandia-stabilized zirconia sintered powders A-J produced in the above Production Example 1 (2) or only the scandia-stabilized zirconia sintered powders A-J produced in the above Production Example 1 (2) was used in place of the zirconia unsintered powder only, one thousand 10Sc1CeSZ sheets were produced.

Production Example 2

(1) Production of Three-Layered Single Cell

An anode paste composed of 70 mass parts of a nickel oxide powder (average particle diameter: 0.9 μm) which was obtained by thermal decomposition of basic nickel carbonate, and 30 mass parts of a 10Sc1CeSZ unsintered powder was screen-printed on one side of the square-shaped 10Sc1CeSZ sintered sheet, which had 100 mm×100 mm of dimension and 250 μm of thickness and was obtained in the above Production Example 1 (1). After drying, the sheet was fired at 1300° C. for 1 hour. Thereby, an anode layer having a thickness of about 50 μm was formed on the 10Sc1CeSZ sintered sheet.

Next, a cathode paste composed of 95 mass parts of strontium-doped lanthanum manganite ($La_{0.8}Sr_{0.2}MgO_3$) powder (manufactured by Seimi Chemical Co., Ltd., average particle diameter: 1.3 μm) and 5 mass parts of a 10Sc1CeSZ unsintered powder was screen-printed on the opposite side of the 10Sc1CeSZ sheet where the anode layer was formed. After drying, the sheet was fired at 1150° C. for 1 hour. Thereby, a cathode layer having a thickness of about 30 μm was formed on the 10Sc1CeSZ sintered sheet. As a result, the three-layered single cell, in which the anode layer and the cathode layer were formed on the 10Sc1CeSZ sheet respectively, was produced.

(2) Production of Sintered Zirconia Powder

Among the three-layered single cells obtained from the above Production Example 2 (1), off-format cells in which the thickness of the electrode layer deviated by ±10% or more from the target thickness, and defective cells having a chip around the periphery were picked up. The picked up cells were put into an elution tank containing 2.5 mol/L of nitric acid. The eluting solution was stirred for 1 hour. Thereby, the nickel oxide component in the anode and the strontium-doped lanthanum manganite component in the cathode were eluted in the nitric acid. Then, the solid and liquid were separated by draining nitric acid. The remained solid pieces were again subjected to the same elution procedure using 2.0 mol/L of nitric acid. The process was repeated until the color of the nitric acid became almost clear. Then, the amounts of Ni, Sr, La and Mn in the nitric acid were measured by an ICP analyzer (manufactured by Shimadzu Corporation, model 'ICP: E-9000'). Furthermore, the above operations of elution and measurement were repeated until the concentrations (metal basis) of all the four elements in the eluate became 100 ppm or less. After the concentrations (metal basis) of all the four elements became 100 ppm or less, the solid pieces were collected, washed with water, and dried. Thereby, pieces of 10Sc1CeSZ sintered sheet were obtained.

The obtained pieces of 10Sc1CeSZ sintered sheet and φ 20 mm zirconia balls were put into a 10 L nylon pot. Then, the pieces were dry-pulverized at 66 rpm for 3 hours. Thereby, the primary dry-pulverized zirconia sintered powder was obtained. The obtained primary dry-pulverized zirconia sintered powder and φ 5 mm zirconia balls were put into a dry-type bead mill (manufactured by Ashizawa Finetech Co., Drystar-SDA5), and the primary powder was dry-pulverized at 660 rpm for 30 minutes. Thereby, a secondary dry-pulverized sintered zirconia powder having 3.1 μm of an average particle diameter (Dr) determined by the laser scattering method was obtained.

Next, the obtained secondary dry-pulverized zirconia sintered powder, ethanol and φ 0.3 mm zirconia beads were put into a bead mill (manufactured by Ashizawa Finetech Co., Ltd., wet-type fine pulverizing/stir device "Star mill"). The secondary powder was wet-pulverized at 3800 rpm for 2 hours. After milling, the milled powder was dried in a spray-dryer. Thereby, the scandia-stabilized zirconia sintered powder K, having De: 0.36 μm, Dr: 0.32 μm, and Dr/De: 1.13, was obtained. The type of pulverizer, rotational speed, duration time of rotation, grinding medium and dispersion medium to obtain the powder K are shown in Table 2.

TABLE 2

| Batch | | Pulverizer | Dry Pulverization | | | | Wet Pulverization |
|---|---|---|---|---|---|---|---|
| | | | Grinding Medium | Rotational Speed | Duration Time | Dr | |
| K | Primary Pulverization | Pot mill | 20 mmφ Zirconia Ball | 66 rpm | 3 hr | | Primary Pulverization |
| | Secondary Pulverization | Bead mill | 5 mmφ Zirconia Ball | 660 rpm | 30 min | 3.1 μm | Secondary Pulverization |

| Batch | Pulverizer | Dispersant | Wet Pelverization | | | | Drying |
|---|---|---|---|---|---|---|---|
| | | | Milling Medium | Rotational Speed | Duration Time | Dr | Method Drier |
| K | Bead Mill | Ethanol | 0.3 mmφ Zirconia Bead None | 3800 rpm | 2 hr | 0.32 μm | Spray Drier |

(3) Production of Zirconia Sintered Sheet

In a similar conditions to the above Production Example 1 (1) except that a mixture of the zirconia unsintered powder and the scandia-stabilized zirconia sintered powder K produced in the above Production Example 2 (2) was used in place of the zirconia unsintered powder only, one thousand 10Sc1CeSZ sheets were produced.

The percentage of the scandia-stabilized zirconia sintered powder to the scandia-stabilized zirconia unsintered powder, the average particle diameter (De) determined using the transmission electron microscope and the average particle diameter (Dr) determined by the laser scattering method of the sintered powder, and the ratio (Dr/De) thereof are shown in Table 3. Furthermore, strengths and failure rates of the obtained scandia-stabilized zirconia sheets are also shown in Table 3.

The warp failure rate was defined by a percentage (%) wherein the number of sheets having an at least 0.8 mm height of warp was divided by 1000, which is the number of the produced zirconia sheets. The dimension failure rate was defined by a percentage (%) wherein the number of sheets of which diagonal length was out of the range of 141. 4 mm±1.0 mm was divided by 1000. In the table, the underline of values indicates that the values are outside the scope of the present invention.

the greensheet unevenly and deformation occurs during firing due to decreased dimensional stability. In industrial mass production, a slight increase of the failure rate is still a problem since such slight increase still causes an enormously larger number of defective sheets.

When a sheet was produced only from the sintered powder, cracks occurred on the scandia-stabilized zirconia sheet. It is considered that sintering between the particles did not occur sufficiently, since the particles had been already sintered once.

On the other hand, when the scandia-stabilized zirconia sintered powder of which average particle diameter (De) determined using the transmission electron microscope, the average particle diameter (Dr) determined by the laser scattering method, and Dr/De were within the scope of the present invention was used in addition to the scandia-stabilized zirconia unsintered powder, the obtained sintered sheet had a strength almost same as that of the sheet produced only from a unsintered powder. In addition, the warp-failure rate and the dimension-failure rate could be satisfactorily reduced. Although the reason is necessarily not

TABLE 3

| | | Sintered Powder | | | | | | | |
|---|---|---|---|---|---|---|---|---|---|
| No. | Batch | Amount Added (Mass %) | De (μm) | Dr (μm) | Dr/De | Sintering Shrinkage (%) | Strength (GPa) | Warp Failure (%) | Dimension Failure (%) |
| 1 | — | 0 | — | — | — | 25.8 | 0.39 | 3.2 | 4.6 |
| 2 | J | 1 | 1.13 | 4.67 | 4.13 | 25.6 | 0.31 | 2.6 | 4.8 |
| 3 | B | 2 | 0.41 | 0.48 | 1.17 | 25.5 | 0.4 | 2.2 | 3.8 |
| 4 | E | | 3.69 | 5.74 | 1.56 | 24.9 | Cracked | — | — |
| 5 | A | 3 | 0.41 | 0.42 | 1.02 | 25.4 | 0.41 | 1.9 | 3.9 |
| 6 | G | | 1.40 | 2.66 | 1.90 | 24.8 | 0.36 | 1.5 | 3.8 |
| 7 | H | | 1.83 | 4.56 | 2.49 | 24.3 | 0.25 | 2.7 | 4.3 |
| 8 | A | 5 | 0.41 | 0.42 | 1.02 | 25.2 | 0.41 | 1.6 | 3.7 |
| 9 | F | | 1.13 | 2.05 | 1.81 | 25.2 | 0.38 | 0.9 | 3.9 |
| 10 | C | 10 | 0.32 | 0.39 | 1.22 | 25.1 | 0.43 | 1.8 | 3.9 |
| 11 | A | | 0.41 | 0.42 | 1.02 | 25.0 | 0.42 | 1.2 | 3.8 |
| 12 | D | | 0.83 | 1.23 | 1.48 | 24.6 | 0.38 | 0.8 | 3.7 |
| 13 | A | 20 | 0.41 | 0.42 | 1.02 | 24.0 | 0.35 | 0.7 | 3.6 |
| 14 | A | 25 | 0.41 | 0.42 | 1.02 | 23.2 | 0.36 | 0.6 | 3.6 |
| 15 | I | 30 | 0.26 | 0.73 | 2.81 | 22.1 | 0.27 | 1.1 | 4.0 |
| 16 | A | 50 | 0.41 | 0.42 | 1.02 | 21.6 | 0.19 | 0.3 | 2.9 |
| 17 | A | 100 | 0.41 | 0.42 | 1.02 | Cracked | — | — | — |
| 18 | K | 8 | 0.36 | 0.32 | 1.13 | 26.2 | 0.35 | 1.8 | 3.2 |

As shown in Table 3, when the average particle diameter (De) of the scandia-stabilized zirconia sintered powder to be used, determined using the transmission electron microscope, was too large, the strength of the obtained scandia-stabilized zirconia sheet decreased and defects such as cracks occurred. The reason is considered as follows though it is not necessarily clear. When the value of De of the sintered powder is large, the sintered powder does not shrink almost at all by firing. Thus, the difference of shrinkages between the unsintered powder that shrinks and the sintered powder that barely shrinks is large. As a result, stresses concentrate on the sintered powder and the periphery thereof. The crack occurs from such portions. Furthermore, the shrinkage by firing becomes uneven, and the sintering does not occur sufficiently, resulting in the lower strength.

On the other hand, if the value of De of the sintered powder was too small, the dimensional failure rate of the obtained scandia-stabilized zirconia sheet was relatively higher. The reason is considered as follows. When the value of De is small, the sintered powder easily aggregates, and the value of De/Dr, which is an indicator of dispersibility, becomes more than 2.5. As a result, the slurry is formed into clear, it is considered that the presence of the once-sintered powder reduces the sintering shrinkage and thus improves the dimensional stability.

In conclusion, it was proved that the present invention enables to efficiently produce scandia-stabilized zirconia sheets having a high strength.

Table 4 below shows the methods of drying the scandia-stabilized zirconia sintered powders A-K as well as the rest angles of the powders.

TABLE 4

| Batch | Drying Method | Rest Angle |
|---|---|---|
| A | Spray Drying | 28° |
| B | Spray Drying | 32° |
| C | Spray Drying | 29° |
| D | Spray Drying | 27° |
| E | (Dry Pulverization Only) | 55° |
| F | Hot-Air Drying | 42° |
| G | Hot-Air Drying | 44° |
| H | (Dry Pulverization Only) | 52° |
| I | Hot-Air Drying | 45° |

TABLE 4-continued

| Batch | Drying Method | Rest Angle |
|---|---|---|
| J | Hot-Air Drying | 40° |
| K | Spray Drying | 30° |

As shown in the above, when the zirconia sintered body was pulverized only by the dry methods and when the zirconia powder was dried by hot air after the wet pulverization, the rest angles were relatively larger and the fluidities of the obtained powders were relatively inferior. On the other hand, when the zirconia powder was spray-dried after the zirconia sintered body was wet-pulverized, the rest angle was relatively smaller, and the fluidity of the obtained powder was superior. Therefore, it was found out possible to obtain a scandia-stabilized zirconia sintered powder superior in fluidity and suitable for industrial mass production by spray-drying the powder after wet-pulverizing a zirconia sintered body.

INDUSTRIAL APPLICABILITY

The present invention enables to produce a scandia-stabilized zirconia sheet having a high strength and high density in an excellent productivity even if a recycled powder which has been already-sintered is used. Therefore, the present invention can make it possible to facilitate the recycle of defective scandia-stabilized zirconia sheets that are expected to increase as the practical realization of solid oxide fuel cells advances. In addition, the present invention enables to reduce the production costs of solid oxide fuel cells. Since scandia is more expensive than yttria, the present invention can significantly reduce the production costs of solid oxide fuel cells by recycling stabilized zirconia sheets containing scandia. The scandia-stabilized zirconia sintered powder according to the present invention is very useful to practice the present invention process. In addition, since the scandia-stabilized zirconia sheet produced by the present invention process has high strength and high density, the sheet is useful as an electrolyte sheet for a solid oxide fuel cell. Therefore, the present invention contributes to the practical realization of a solid oxide fuel cell, and is very valuable for the industrial use.

The invention claimed is:

1. An electrolyte sheet for a solid oxide fuel cell comprising a scandia-stabilized zirconia sheet, comprising a sintered mixture of a zirconia unsintered powder and the scandia-stabilized zirconia sintered powder, the scandia-stabilized zirconia sintered powder comprising:
   more than 0.3 µm and not more than 1.5 µm of an average primary particle diameter (De) determined by a transmission electron microscope;
   more than 0.3 µm and not more than 3.0 µm of an average secondary particle diameter (Dr) determined by a laser scattering method using a dispersion obtained by adding 0.01-0.5 mass % of the power to 100 $cm^3$ of an aqueous solution containing 0.2 mass % of sodium metaphosphate and dispersing the powder by supersonic wave for 3 minutes; and
   more than 1.0 and not more than 2.5 of a ratio (Dr/De) of the average particle diameter determined by the laser scattering method to the average particle diameter determined by the transmission electron microscope;
   wherein the scandia-stabilized zirconia sheet further comprises not less than 0.35 GPa of a three-point flexural strength; and not less than 98% of a relative density relative to a theoretical density; and,
   wherein the scandia-stabilized zirconia sintered powder is not less than 2 mass % and not more than 40 mass % of a sum of the zirconia unsintered powder and the scandia-stabilized zirconia sintered powder combined.

2. A solid oxide fuel cell, comprising the electrolyte sheet of claim 1.

3. The electrolyte sheet of claim 1, wherein a rest angle of the scandia-stabilized zirconia sintered powder is not less than 15° and not more than 35°.

4. The electrolyte sheet of claim 1, wherein the Scandia-stabilized zirconia sintered powder contains a cubic system and/or a rhombohedral system.

* * * * *